(12) United States Patent  (10) Patent No.: US 7,836,174 B2
Lunde  (45) Date of Patent: Nov. 16, 2010

(54) SYSTEMS AND METHODS FOR GRID-BASED DATA SCANNING

(75) Inventor: Norman R. Lunde, Middletown, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 366 days.

(21) Appl. No.: 12/022,822

(22) Filed: Jan. 30, 2008

(65) Prior Publication Data

US 2009/0193113 A1 Jul. 30, 2009

(51) Int. Cl.
*G06F 15/173* (2006.01)
(52) U.S. Cl. .................. 709/224; 709/203; 709/219
(58) Field of Classification Search .............. 709/203, 709/224, 206, 219; 713/201
See application file for complete search history.

(56) References Cited

U.S. PATENT DOCUMENTS

| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |

(Continued)

FOREIGN PATENT DOCUMENTS

EP 0 259 912 3/1988

(Continued)

OTHER PUBLICATIONS

U.S. Appl. No. 11/563,940, filed Nov. 28, 2006, Prahlad et al.

(Continued)

*Primary Examiner*—Frantz B Jean
(74) *Attorney, Agent, or Firm*—Knobbe Martens Olson & Bear, LLP

(57) ABSTRACT

A computing grid for performing scanning operations on electronic data in a networked computing environment. The data scanning operations may include scanning data for viruses or other malicious software code. The computing grid for performing data scanning operations may include one or more event detectors to detect data scanning events and one or more grid scanning elements to perform the data scanning operations. The computing grid may also include a grid coordinator to monitor the grid configuration, perform necessary updates to the grid, and to take pre-determined actions based on the results of the data scans.

25 Claims, 7 Drawing Sheets

U.S. PATENT DOCUMENTS

| | | | |
|---|---|---|---|
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,519,865 A | 5/1996 | Kondo et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitsky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,832,510 A | 11/1998 | Ito et al. |
| 5,875,478 A | 2/1999 | Blumenau |
| 5,887,134 A | 3/1999 | Ebrahim |
| 5,892,917 A | 4/1999 | Myerson |
| 5,901,327 A | 5/1999 | Ofek |
| 5,907,621 A | 5/1999 | Bachman et al. |
| 5,924,102 A | 7/1999 | Perks |
| 5,950,205 A | 9/1999 | Aviani, Jr. |
| 5,953,721 A | 9/1999 | Doi et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,061,692 A | 5/2000 | Thomas et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,240,416 B1 | 5/2001 | Immon et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,683 B1 | 7/2002 | Lamburt |
| 6,421,711 B1 | 7/2002 | Blumenau et al. |
| 6,421,779 B1 | 7/2002 | Kuroda et al. |
| 6,430,575 B1 | 8/2002 | Dourish et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,625,623 B1 | 9/2003 | Midgley et al. |
| 6,647,396 B2 | 11/2003 | Parnell et al. |
| 6,658,436 B2 | 12/2003 | Oshinsy et al. |
| 6,658,526 B2 | 12/2003 | Nguyen et al. |
| 6,732,124 B1 | 5/2004 | Koseki et al. |
| 6,763,351 B1 | 7/2004 | Subramaniam et al. |
| 6,775,790 B2 | 8/2004 | Reuter et al. |
| 6,847,984 B1 | 1/2005 | Midgley et al. |
| 6,871,163 B2 | 3/2005 | Hiller et al. |
| 6,886,020 B1 | 4/2005 | Zahavi et al. |
| 6,947,935 B1 | 9/2005 | Horvitz et al. |
| 6,983,322 B1 | 1/2006 | Tripp et al. |
| 6,996,616 B1 | 2/2006 | Leighton et al. |
| 7,003,519 B1 | 2/2006 | Biettron et al. |
| 7,035,880 B1 | 4/2006 | Crescenti et al. |
| 7,103,740 B1 | 9/2006 | Colgrove et al. |
| 7,130,970 B2 | 10/2006 | Devassy et al. |
| 7,167,895 B1 | 1/2007 | Connelly |
| 7,181,444 B2 | 2/2007 | Porter et al. |
| 7,216,043 B2 * | 5/2007 | Ransom et al. ............... 702/62 |
| 7,240,100 B1 | 7/2007 | Wein et al. |
| 7,246,207 B2 | 7/2007 | Kottomtharayil et al. |
| 7,246,211 B1 | 7/2007 | Beloussov et al. |
| 7,330,997 B1 | 2/2008 | Odom |
| 7,346,623 B2 | 3/2008 | Prahlad et al. |
| 7,346,676 B1 | 3/2008 | Swildens et al. |
| 7,359,917 B2 | 4/2008 | Winter et al. |
| 7,454,569 B2 | 11/2008 | Kavuri et al. |
| 7,500,150 B2 | 3/2009 | Sharma et al. |
| 7,529,748 B2 | 5/2009 | Wen et al. |
| 7,533,103 B2 | 5/2009 | Brendle et al. |
| 7,583,861 B2 | 9/2009 | Hanna et al. |
| 7,590,997 B2 | 9/2009 | Perez |
| 7,613,752 B2 | 11/2009 | Prahlad et al. |
| 7,627,598 B1 | 12/2009 | Burke |
| 7,627,617 B2 | 12/2009 | Kavuri et al. |
| 2002/0004883 A1 | 1/2002 | Nguyen et al. |
| 2002/0049738 A1 | 4/2002 | Epstein |
| 2002/0069324 A1 | 6/2002 | Gerasimov et al. |
| 2002/0083055 A1 | 6/2002 | Pachet et al. |
| 2002/0087550 A1 | 7/2002 | Carlyle et al. |
| 2002/0133476 A1 | 9/2002 | Reinhardt |
| 2002/0174107 A1 | 11/2002 | Poulin |
| 2003/0018607 A1 | 1/2003 | Lennon et al. |
| 2003/0115219 A1 | 6/2003 | Chadwick |
| 2003/0130993 A1 | 7/2003 | Mendelevitch et al. |
| 2003/0182583 A1 | 9/2003 | Turco |
| 2004/0010487 A1 | 1/2004 | Prahlad et al. |
| 2004/0010493 A1 | 1/2004 | Kojima et al. |
| 2004/0015468 A1 | 1/2004 | Beier et al. |
| 2004/0015514 A1 | 1/2004 | Melton et al. |
| 2004/0139059 A1 | 7/2004 | Conroy et al. |
| 2004/0254919 A1 | 12/2004 | Giuseppini |
| 2004/0255161 A1* | 12/2004 | Cavanaugh ............... 713/201 |

| | | | |
|---|---|---|---|
| 2004/0260678 A1 | 12/2004 | Verbowski et al. | |
| 2005/0021537 A1 | 1/2005 | Brendle et al. | |
| 2005/0033800 A1 | 2/2005 | Kavuri et al. | |
| 2005/0037367 A9* | 2/2005 | Fiekowsky et al. | 435/6 |
| 2005/0044114 A1 | 2/2005 | Kottomtharayil et al. | |
| 2005/0050075 A1 | 3/2005 | Okamoto et al. | |
| 2005/0114406 A1 | 5/2005 | Borthakur et al. | |
| 2005/0154695 A1 | 7/2005 | Gonzalez et al. | |
| 2005/0182773 A1 | 8/2005 | Feinsmith | |
| 2005/0182797 A1 | 8/2005 | Adkins et al. | |
| 2005/0188248 A1 | 8/2005 | O'Brien et al. | |
| 2005/0193128 A1 | 9/2005 | Dawson et al. | |
| 2005/0203964 A1 | 9/2005 | Matsunami et al. | |
| 2005/0216453 A1 | 9/2005 | Sasaki et al. | |
| 2005/0228794 A1 | 10/2005 | Navas et al. | |
| 2005/0257083 A1 | 11/2005 | Cousins | |
| 2005/0262097 A1 | 11/2005 | Sim-Tang et al. | |
| 2005/0289193 A1 | 12/2005 | Arrouye et al. | |
| 2006/0004820 A1 | 1/2006 | Claudatos et al. | |
| 2006/0010227 A1 | 1/2006 | Atluri | |
| 2006/0031225 A1 | 2/2006 | Palmeri et al. | |
| 2006/0031263 A1 | 2/2006 | Arrouye et al. | |
| 2006/0031287 A1 | 2/2006 | Ulrich et al. | |
| 2006/0101285 A1 | 5/2006 | Chen et al. | |
| 2006/0106814 A1 | 5/2006 | Blumenau et al. | |
| 2006/0195449 A1 | 8/2006 | Hunter et al. | |
| 2006/0224846 A1 | 10/2006 | Amarendran et al. | |
| 2006/0253495 A1 | 11/2006 | Png | |
| 2006/0259468 A1 | 11/2006 | Brooks et al. | |
| 2006/0259724 A1 | 11/2006 | Saika | |
| 2006/0294094 A1 | 12/2006 | King et al. | |
| 2007/0027861 A1 | 2/2007 | Huentelman et al. | |
| 2007/0033191 A1 | 2/2007 | Hornkvist et al. | |
| 2007/0112809 A1 | 5/2007 | Arrouye et al. | |
| 2007/0179995 A1 | 8/2007 | Prahlad et al. | |
| 2007/0185914 A1 | 8/2007 | Prahlad et al. | |
| 2007/0185915 A1 | 8/2007 | Prahlad et al. | |
| 2007/0185916 A1 | 8/2007 | Prahlad et al. | |
| 2007/0185917 A1 | 8/2007 | Prahlad et al. | |
| 2007/0185921 A1 | 8/2007 | Prahlad et al. | |
| 2007/0185925 A1 | 8/2007 | Prahlad et al. | |
| 2007/0185926 A1 | 8/2007 | Prahlad et al. | |
| 2007/0192360 A1 | 8/2007 | Prahlad et al. | |
| 2007/0192385 A1 | 8/2007 | Prahlad et al. | |
| 2007/0198570 A1 | 8/2007 | Prahlad et al. | |
| 2007/0198593 A1 | 8/2007 | Prahlad et al. | |
| 2007/0198601 A1 | 8/2007 | Prahlad et al. | |
| 2007/0198608 A1 | 8/2007 | Prahlad et al. | |
| 2007/0198611 A1 | 8/2007 | Prahlad et al. | |
| 2007/0198612 A1 | 8/2007 | Prahlad et al. | |
| 2007/0198613 A1 | 8/2007 | Prahlad et al. | |
| 2007/0203937 A1 | 8/2007 | Prahlad et al. | |
| 2007/0203938 A1 | 8/2007 | Prahlad et al. | |
| 2007/0288536 A1 | 12/2007 | Sen et al. | |
| 2008/0021921 A1 | 1/2008 | Horn | |
| 2008/0059515 A1 | 3/2008 | Fulton | |
| 2008/0091655 A1 | 4/2008 | Gokhale et al. | |
| 2008/0228771 A1 | 9/2008 | Prahlad et al. | |
| 2008/0243796 A1 | 10/2008 | Prahlad et al. | |
| 2008/0249996 A1 | 10/2008 | Prahlad et al. | |
| 2008/0263029 A1 | 10/2008 | Guha et al. | |
| 2008/0294605 A1 | 11/2008 | Prahlad et al. | |
| 2009/0287665 A1 | 11/2009 | Prahlad et al. | |

FOREIGN PATENT DOCUMENTS

| | | |
|---|---|---|
| EP | 0 405 926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| EP | 1 174 795 | 1/2002 |
| WO | WO 95/13580 | 5/1995 |
| WO | WO 99/12098 | 3/1999 |
| WO | WO 99/14692 | 3/1999 |
| WO | WO 2003/060774 | 7/2003 |
| WO | WO 2005/055093 | 6/2005 |
| WO | WO 2007/062254 | 5/2007 |
| WO | WO 2007/062429 | 5/2007 |
| WO | WO 2008/049023 | 4/2008 |

OTHER PUBLICATIONS

U.S. Appl. No. 11/564,119, filed Nov. 28, 2006, Prahlad et al.
U.S. Appl. No. 11/564,130, filed Nov. 28, 2006, Prahlad et al.
U.S. Appl. No. 11/564,136, filed Nov. 28, 2006, Prahlad et al.
U.S. Appl. No. 11/564,153, filed Nov. 28, 2006, Prahlad et al.
U.S. Appl. No. 11/564,163, filed Nov. 28, 2006, Prahlad et al.
U.S. Appl. No. 11/564,170, filed Nov. 28, 2006, Prahlad et al.
U.S. Appl. No. 11/564,174, filed Nov. 28, 2006, Prahlad et al.
U.S. Appl. No. 11/564,177, filed Nov. 28, 2006, Prahlad et al.
U.S. Appl. No. 11/564,180, filed Nov. 28, 2006, Prahlad et al.
U.S. Appl. No. 11/564,194, filed Nov. 28, 2006, Prahlad et al.
U.S. Appl. No. 11/564,197, filed Nov. 28, 2006, Prahlad et al.
U.S. Appl. No. 11/564,215, filed Nov. 28, 2006, Prahlad et al.
U.S. Appl. No. 11/564,220, filed Nov. 28, 2006, Prahlad et al.
U.S. Appl. No. 11/564,221, filed Nov. 28, 2006, Prahlad et al.
U.S. Appl. No. 11/564,233, filed Nov. 28, 2006, Prahlad et al.
U.S. Appl. No. 11/605,931, filed Nov. 28, 2006, Prahlad et al.
U.S. Appl. No. 11/605,932, filed Nov. 28, 2006, Prahlad et al.
U.S. Appl. No. 11/605,944, filed Nov. 28, 2006, Prahlad et al.
U.S. Appl. No. 11/931,034, filed Oct. 31, 2007, Kottomtharayil et al.
U.S. Appl. No. 12/058,487, filed Mar. 28, 2008, Prahlad.
U.S. Appl. No. 12/058,575, filed Mar. 28, 2008, Prahlad et al.
U.S. Appl. No. 12/058,589, filed Mar. 28, 2008, Prahlad et al.
U.S. Appl. No. 12/511,653, filed Jul. 29, 2009, Prahlad et al.
U.S. Appl. No. 12/548,953, filed Aug. 27, 2009, Ahn et al.
U.S. Appl. No. 12/695,203, filed Jan. 28, 2010, Prahlad et al.
U.S. Appl. No. 12/695,289, filed Jan. 28, 2010, Prahlad et al.
"Text Figures," retrieved from http://www.microsoft.com/msj/1198.ntfs/ntfstextfigs.htm on Nov. 10, 2005, 7 pages.
Armstead, et al.; "Implementation of a Campus-wide Distributed Mass Storage Service: The Dream vs. Reality," IEEE, 1995, pp. 190-199.
Arneson, "Mass Storage Archiving in Network Environments" IEEE, 1998, pp. 45-50.
O'Neill, "New Tools to Classify Data," Storage Magazine, Aug. 2005, retrieved from http://storagemagazine.techtarget.com/magPrintFriendly/0,293813,sid35_gci1114703,00.html on Aug. 25, 2005, 4 pages.
Cabrera, et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 2005, pp. 420-427, San Francisco, CA.
Communication with extended European Search Report for Application No. PCT/US2006/061304, dated Dec. 30, 2008.
Cooperstein, et al., "Keeping an Eye on Your NTFS Drives: The Windows 2000 Change Journal Explained," Sep. 1999, retrieved from http://www.microsoft.com/msj/0999/journal/journal.aspx on Nov. 10, 2005, 17 pages.
Eitel, "Backup and Storage Management in Distributed Heterogeneous Environments," IEEE, 1994, pp. 124-126.
EMC Corporation, "Today's Choices for Business Continuity," 2004, 12 pages.
Examination Report for European Application No. 06 844 595.6, Mail Date: Sep. 26, 2008, 5 pages.
Gait, "The Optical File Cabinet: A Random-Access File system for Write-Once Optical Disks," IEEE Computer, vol. 21, No. 6, pp. 11-22 (1988) (see in particular figure 5 in p. 15 and the recitation in claim 5).
http://en.wikipedia.org/wiki/Naive_Bayes_classifier.
Jander, "Launching Storage-Area Net," Data Communications, US, McGraw Hill, NY, vol. 27, No. 4 (Mar. 21, 1998), pp. 64-72.

Langdon, et al., "Data Classification: Getting Started," Storage Magazine, Jul. 2005, retrieved from http://storagemagazine.techtarget.com/magPrintFriendly/0,293813,sid35_gci1104445,00.html; on Aug. 25, 2005, 3 pages.

Microsoft, "GetFileAttributes," updated Sep. 2005, retrieved from http://msdn.microsoft.com/library/en-us/fileio/fs/getfileattributes.asp?frame=true on Nov. 10, 2005, 3 pages.

Microsoft, "GetFileAttributesEx," updated Sep. 2005, retrieved from http://msdn.microsoft.com/library/en-us/fileio/fs/getfileattributesex.asp?frame=true on Nov. 10, 2005, 2 pages.

Microsoft, "WIN32_File_Attribute_Data," updated Sep. 2005, retrieved from http://msdn.microsoft.com/library/en-us/fileio/fs/win32_file_attribute_data_str.asp?frame on Nov. 10, 2005, 3 pages.

Partial International Search Results, mailed May 25, 2007, International Application No. PCT/US2006/045556, 2 pages.

PCT International Search Report and Written Opinion for International Application No. PCT/US07/81681, Mail Date: Nov. 13, 2009, 8 pages.

Richter, et al., "A File System for the 21st Century: Previewing the Windows NT 5.0 Files System," Nov. 1998, retrieved from http://www.microsoft.com/msj/1198/ntfs/ntfs.aspx on Nov. 10, 2005, 17 pages.

Rosenblum, et al., "The Design and Implementation of a Log-Structure File System," Operating Systems Review SIGOPS, vol. 25, No. 5, New York, US, pp. 1-15 (May 1991).

Search Report for European Application No. 06 844 595.6, Mail Date: Sep. 26, 2008, 5 pages.

http://en.wikipedia.org/wiki/Machine_learning.

* cited by examiner

SYSTEMS AND METHODS FOR GRID-BASED DATA SCANNING

BACKGROUND OF THE INVENTION

1. Field of the Invention

The field of the invention relates to methods and systems for performing scanning operations on data. More particularly, the field of the invention relates to a grid-based method and system for performing such operations.

2. Description of the Related Art

As modern enterprise environments trend towards a paperless workplace, electronic data is often created at a high rate. This electronic data takes a variety of forms which may include emails, documents, spreadsheets, images, databases, etc. Businesses have a need to effectively and securely store all of this electronic data in ways which are time and cost effective. However, there are problems that arise with these tasks due to the sheer amount of electronic data created and stored within a modern business.

For example, some electronic files which enter a business' computing environment may need to be scanned before or shortly after they are stored, and scanning a large number of files can consume substantial computing resources. One common reason to scan a file is to search for computer viruses or other malicious software code which can corrupt other data or harm a business' computing infrastructure. As the prevalence and sophistication of computer viruses and other forms of harmful software have increased, virus scanners have become an indispensable tool for businesses.

Typically, scanners are implemented either as real-time "filters" or as off-line "batch" processes. The filters, sometimes implemented as file system filter drivers, are software products that insert themselves into the I/O processing path of the operating system. Filters intercept certain types of file I/O requests and check the file contents for known virus signatures, suspicious characteristics, or suspicious patterns of activity. When such suspicious patterns are detected, the filter blocks the completion of the I/O request and takes some protective action, such as deleting or quarantining the suspect file.

As virus authors apply more sophisticated techniques, such as self-mutating or encrypted code, the filter logic required to detect such viruses becomes more and more complex, demanding more processing time and memory from the computer system to inspect the files. This can adversely affect the performance of the system and, in some cases, force a user to downgrade the level of protection in order to keep the system at a usable level of responsiveness.

Batch scanners take a different approach to scanning computer data for viruses. Rather than scanning files as certain I/O requests are made, batch scanners systematically traverse the file system in search of malicious software code. While they do not interfere with other applications directly, i.e. by increasing the latency of I/O requests, batch scanners can place a large processing load on the system. For this reason, they are typically run at night or during off-hours, when the computer system is not actively in use. In some cases, because batch scanners run intermittently, viruses may have hours or even days to propagate between scans. Filters may also suffer from this drawback as new virus types may emerge and infect the system before the filter's database of virus signatures has been updated to meet the threat.

It can be difficult to scale traditional methods of scanning computer files, whether for viruses or some other reason, to meet the needs of large file systems and active servers because both methods consume substantial resources from the host operating system. Filters can add significant latency to each I/O request, slowing the system down incrementally, whereas batch scanners can create a period of peak activity which noticeably degrades the performance of other applications.

SUMMARY OF THE INVENTIONS

Therefore, there is a need for a computer system capable of removing at least a portion of the computing burden associated with virus scanning. Ideally, such a system would be easily scalable to grow to meet future needs.

This specification describes different embodiments of a grid-based system for performing scanning operations on computer data. In some embodiments, the scanning operations comprise scanning files for viruses and other types of malicious software code. In other embodiments, the scanning operations may comprise scanning files for any type of content defined by a user of the system. In any case, the grid-based system can reduce the computing burden on a computing system by distributing the computing load amongst a grid of processing elements. In one embodiment, the system comprises event detectors to detect file scanning events as well as one or more distributed scanning elements to perform the actual file scanning. Some embodiments may also include a grid coordinator to monitor the grid configuration, perform necessary updates to the grid, and to take pre-determined actions based on the results of the file scans.

In another embodiment, a grid-based system for performing scanning operations on computer data can be incorporated into a multi-purpose data storage system. The data storage system can perform a suite of storage-related operations on electronic data for one or more client computers in a networked environment. The storage system can be composed of modular storage cells which function in a coordinated manner. These cells can act as building blocks to create a data storage system that is scalable and adaptable in terms of the storage capacity and functionality that it provides for a computing system.

The storage-related operations performed by the data storage system may include data backup, migration, and recovery. Many other storage-related operations are also possible. This specification describes one embodiment of the invention where such a data storage system can be adapted to include a computing grid for performing file scanning operations on data stored in the system by one or more client computers.

DETAILED DESCRIPTION OF THE PREFERRED EMBODIMENTS

It may be advantageous for a data storage and backup system to perform file scanning for several reasons. One reason is to detect the presence of computer viruses or other malicious software code in any file that is stored in the system before the virus has an opportunity to spread and corrupt other data stored in the system. Another reason to perform file scanning on files as they are stored in the system may be to aid in the enforcement of administrative policies which restrict certain uses of the host computing system. For example, local administrative policy may prohibit files containing pornography, copyrighted material, or frivolous data which wastes available resources such as music or game files. Files may be scanned for content to identify the presence of any prohibited material so that appropriate administrative action can be taken.

File scanning can require significant computing resources. Unfortunately, due to the sheer number of files that exist in a modern computing environment, performing such file scanning on each and every file can place a tremendous computing load on the host computing system. The added computational burden from performing these operations can introduce unreasonable latency into the host computing system, severely hampering its ability to respond to other computing requests from users.

One solution to this problem, according to one embodiment of the disclosed inventions, is to integrate a computing grid within the host computing system. Such a computing grid can fulfill at least a portion of the scanning needs of the host computing system thereby freeing up the system for other uses. As discussed below, the computing grid can be dedicated to scanning files within the host computing system, whether for viruses or some other type of content, though the computing grid can be used for a wide variety of other computational purposes. Therefore, the computing grid described below will often be referred to as a scanning grid with the understanding that it could also be used for other purposes.

Figure 1:
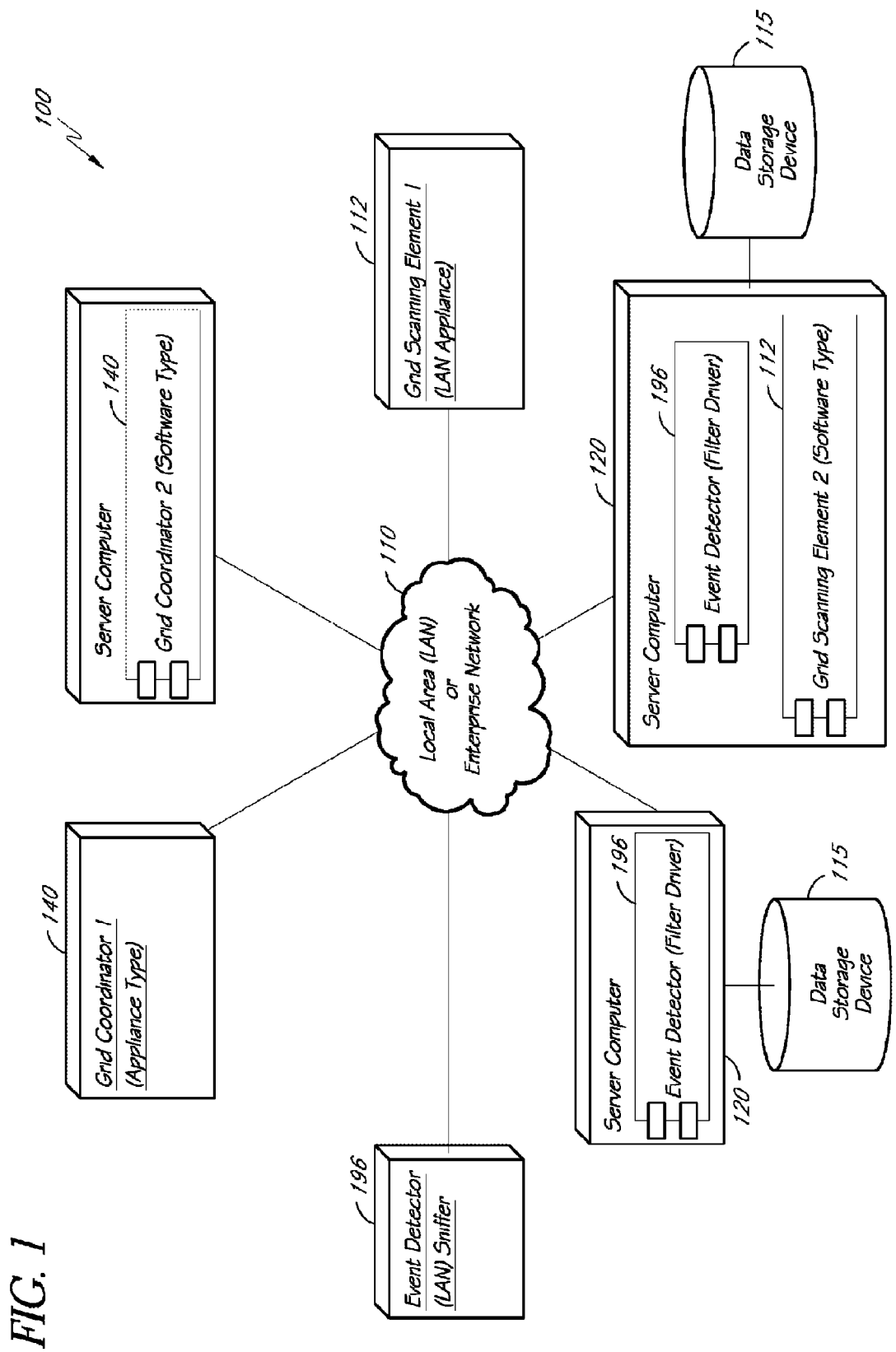
FIG. 1 is a schematic illustration of an embodiment of a scanning grid incorporated into a server based data storage system.
Figure 2:
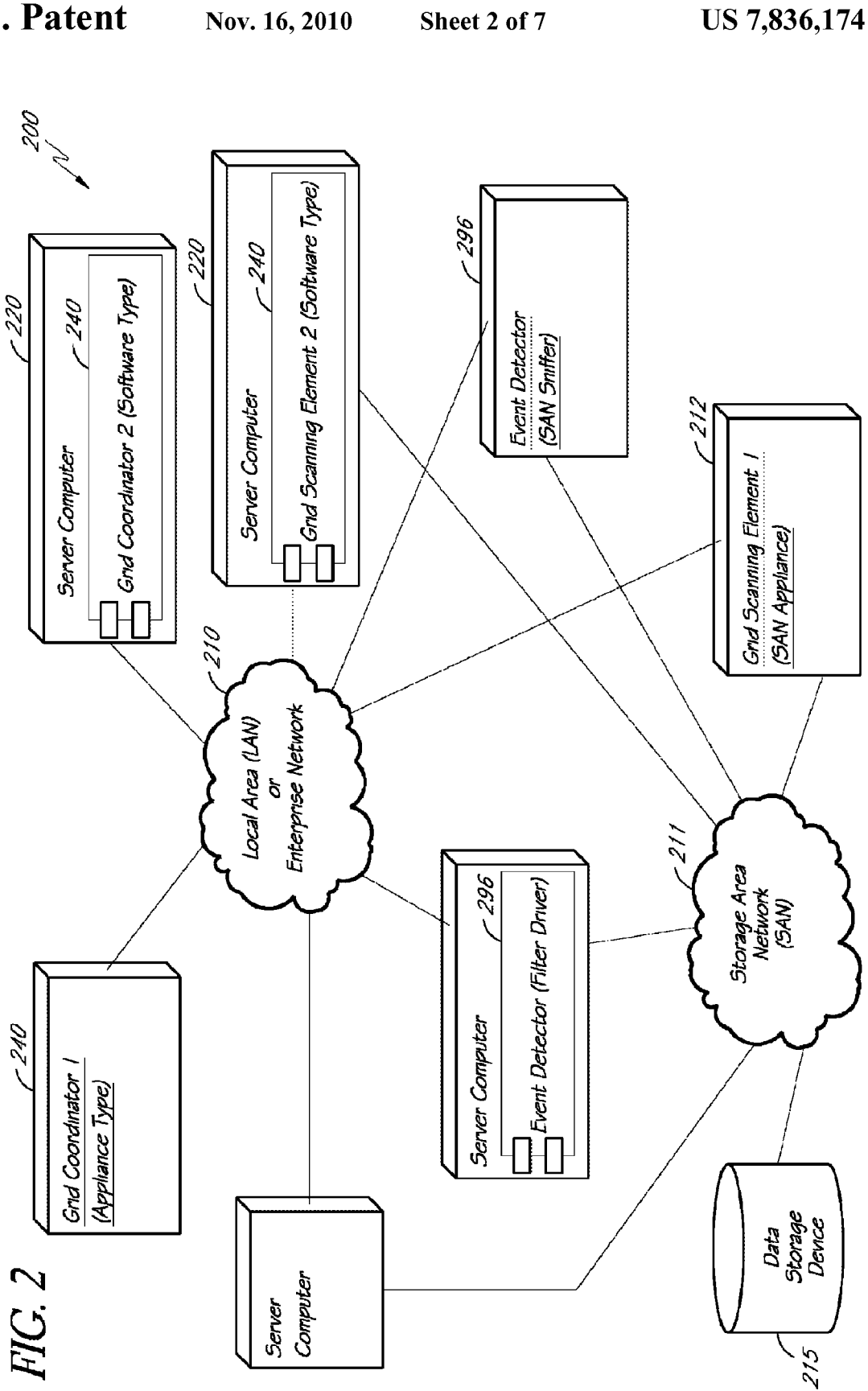
FIG. 2 is a schematic illustration of an embodiment of a scanning grid incorporated into a computing system which includes a Storage Area Network (SAN).
Figure 3:
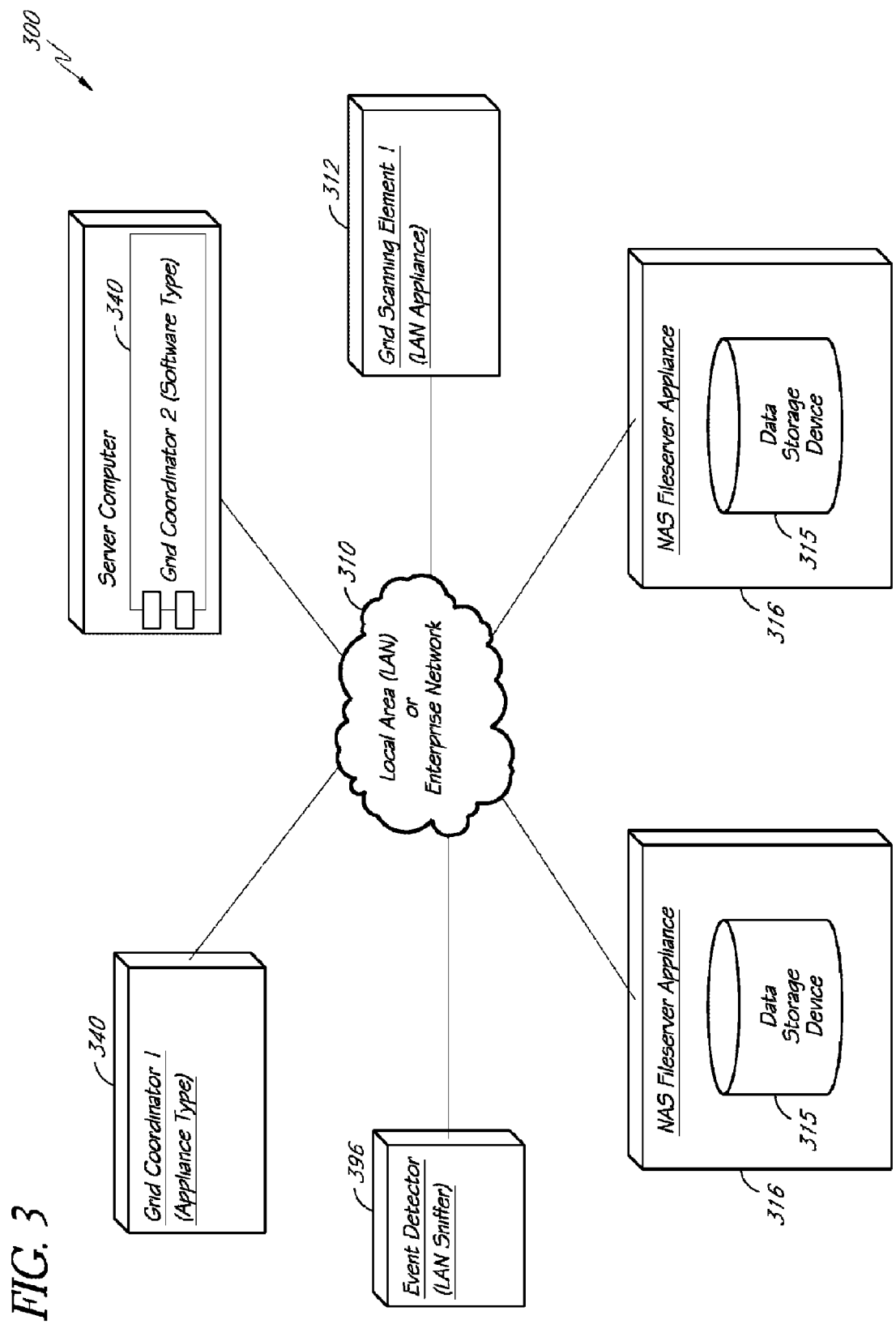
FIG. 3 is a schematic illustration of an embodiment of a scanning grid incorporated into a computing system which includes a Network Attached Storage (NAS) unit.

The scanning grid can be integrated into a wide variety of computing systems. FIGS. 1-3 illustrate how this can be done in the case of three different types of computing systems. However, it should be understood that, based on this disclosure, other types of computing systems can be used.

FIG. 1 illustrates a scanning grid integrated within a host computing system 100 that includes file server computers 120 with attached storage space 115 for electronic data. The file servers 120 and the attached data storage 115 may comprise a network file system to store data for any number of client computers (not shown) in communication with the servers through the LAN network 110.

The scanning grid incorporated into the host computer system 100 can include one or more event detectors 196, one or more grid scanning elements 112, and one or more grid coordinators 140. An event detector 196 can be used to detect when scanning events arise which could be advantageously handled by the scanning grid rather than the host computing system. In one embodiment, an event detector 196 is programmed to detect file scanning events generated by a client computer or from some other source. File scanning events may include the creation of new files by a user of a client computer served by the network filing system, modifications to existing files, or the occurrence of any other set of circumstances which could beneficially trigger a scan event.

The event detector 196 may be implemented as a file system filter driver on a file server 120 which intercepts file creation and change requests as they are processed by the operating system of the file server 120. Event detectors of this type are illustrated in FIG. 1 as modules within the file server computers 120. In other embodiments, an event detector 196 may rely on notifications of file scanning events which are generated by the operating system itself for the benefit of conventional anti-virus software. In still other embodiments, an event detector 196 may detect file scanning events by snooping through data packets as changes to the file system are requested over a network. Event detectors of this type are illustrated in FIG. 1 as a LAN sniffer and in FIG. 2 as a Storage Area Network (SAN) sniffer.

After a file scan event is detected, there is a choice between scanning the new or modified file prior to it being stored or storing the file and then scanning it in due course. The advantage of the former alternative is that it prevents the introduction of a contaminated file into the file system. However, this method may also tend to lengthen the time required to store the file, increasing latency of file system I/O operations. The advantage of the latter alternative is that no additional file storage latency is introduced, but the cost is that the file system may be exposed to a file contaminated with a virus for a short time until the file can be scanned and appropriate action taken. For this reason, some embodiments of the invention may include a user configurable option to appropriately balance the tradeoff of system performance with data integrity according to the user's needs.

When an event detector 196 detects a file scanning event it may then determine the identity and location of the particular file or files to be scanned. Depending on the particular implementation of the host computing system 100, the information needed to uniquely identify a file will vary. For example, a network hostname with a fully qualified file path may be necessary to uniquely identify a file. In embodiments where storage devices 115 are connected to the storage system via a Fibre Channel-based SAN (illustrated in FIG. 2), an event detector 196 may collect a World-Wide Name, a Logical Unit Number, and a Logical Block Address of the file that triggered a particular file scanning event. In embodiments where storage devices 115 are connected to the host computing system via a Network Attached Storage (NAS) unit (illustrated in FIG. 3), different identifying information may be required.

Once an event detector 196 has assembled sufficient information to uniquely identify and locate the file or files-to-be-scanned, it can packetize the information and generate an event message detailing the information necessary for a grid scanning element 112 to access and scan the file(s) which triggered the scanning event. A load-sharing algorithm can be performed to determine which of the plurality of grid scanning elements 112 (no such load sharing algorithm would be required in cases where the scanning grid is configured with a single grid scanning element 112) should handle a particular scanning event. In one embodiment, the load-sharing algorithm can be performed by an event detector 196 to elect a single grid scanning element 112 to handle the detected scanning event. In such an embodiment, the event detector 196 may notify the specifically elected grid scanning element 112 of the scanning event. In another embodiment, the event detector 196 may notify each of the plurality of grid scanning elements 112 of the scanning event and then each individual grid scanning element 112 may separately perform the load-balancing algorithm to determine whether it has been elected to handle the detected event. Once a grid scanning element 112 has been elected, it will handle the scanning event while other grid scanning elements 112 generally will ignore the detected event.

In some embodiments, the event message is sent to each of the active grid scanning elements 112. (Information on the activity status of each grid scanning element can be supplied to the event detector 196 by a grid coordinator 140.) In cases where an event message is sent to a grid scanning element 112 over the LAN 110, the event detector 196 can reduce network utilization by sending a single multicast protocol message, such as a User Datagram Protocol (UDP) datagram.

Grid scanning elements 112 can be implemented in a number of ways. For example, a grid scanning element 112 may comprise a network appliance device coupled to the LAN 110. In other embodiments, a grid scanning element 112 may comprise a software module run by a file server computer 120. Each grid scanning element 112 may include a processing unit to carry out file scanning operations, a locally attached non-volatile memory, a conventional network interface such as Ethernet, and one or more storage network interfaces (Fibre Channel, SCSI, etc.), as dictated by the configuration of the host computing system 100 and other factors. It is within the ability of one of ordinary skill in the art to determine a satisfactory configuration for the grid scanning elements 112 in various embodiments of the invention.

Once a grid scanning element 112 has been elected, it accesses the data-to-be-scanned based on information it has received from an event detector 196. Depending upon the particular host computing system to which the scanning grid is integrated, the data may be accessed through a file server computer 120, a SAN network (illustrated in FIG. 2), a NAS network (illustrated in FIG. 3), or in some other way. The benefit of SAN and NAS storage networks in this regard is that the host computing system's data storage devices will have multiple access points, such as network ports, by which grid scanning elements 112 can access data. Once the elected grid scanning element 112 has accessed the data, it performs the necessary scanning operation on the data, whether it be a virus scan or a scan for some other type of file content. In some embodiments, once the scan operation has been performed, the elected grid scanning element 112 may send a report of the outcome of the operation to a grid coordinator 140.

Figure 4A:
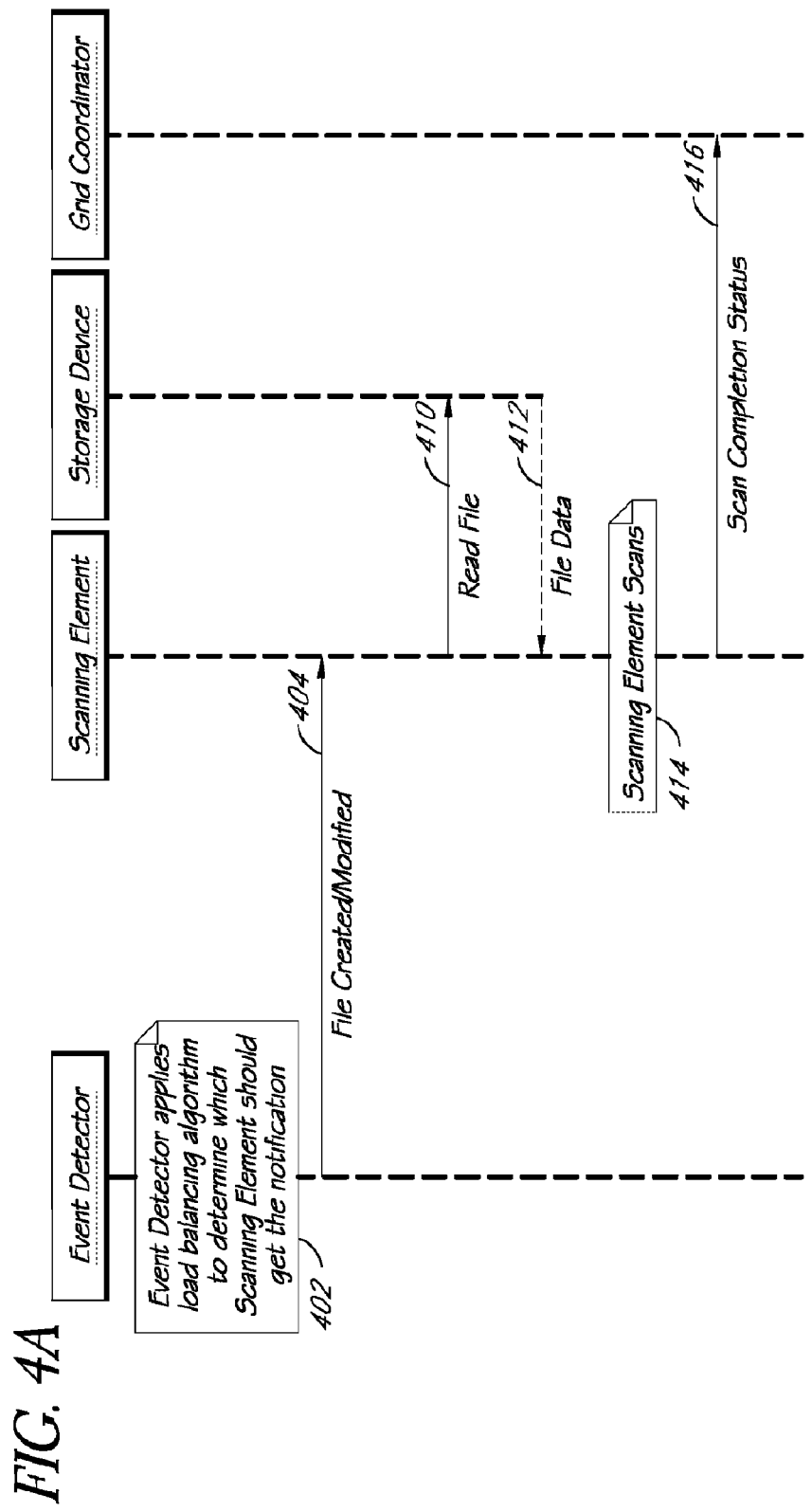
FIGS. 4A and 4B are illustrative flowcharts of the operation of a scanning grid according to embodiments of the invention.
Figure 4B:
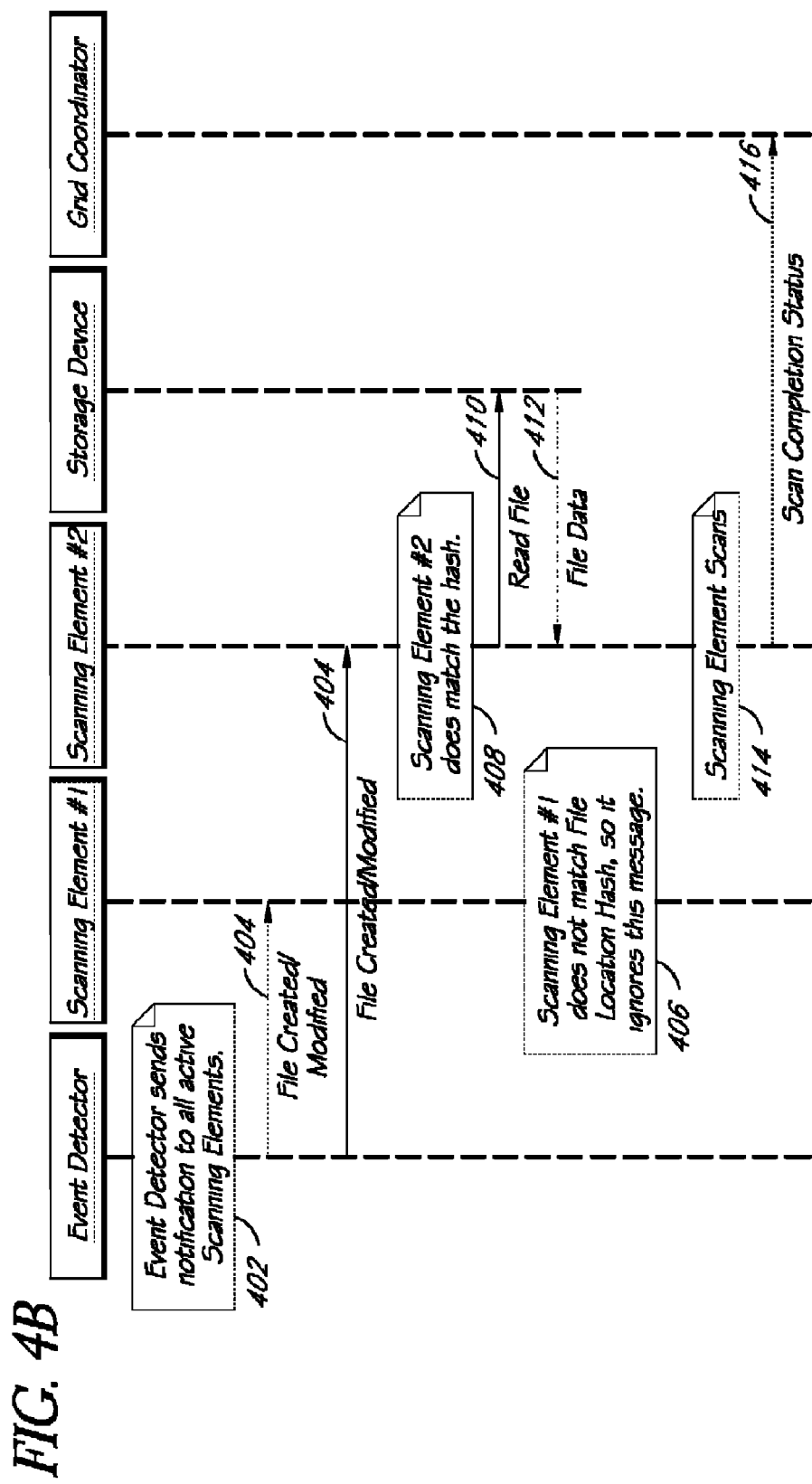

FIGS. 4A and 4B are flowcharts which illustrate the sequence of events described thus far in certain exemplary embodiments of the invention. FIG. 4A is illustrative of a uni-cast implementation where an event detector 196 identifies a single grid scanning element 112 to handle a detected scanning event. FIG. 4B illustrates a multi-cast implementation where an event detector 196 broadcasts a detected event to a plurality of grid scanning elements 112. At block 402 of both FIG. 4A and FIG. 4B, an event detector 196 detects a file scanning event. In many cases this will correspond to a newly created or modified file.

Arrows 404 of FIGS. 4A and 4B are representative of communications between the event detector 112 and one or more grid scanning elements 112 concerning the detected scanning event. The communications will generally include information regarding the nature of the detected scanning event as well as any information necessary for a grid scanning element to access the event-causing data from a storage device. In the uni-cast implementation of FIG. 4A, the event detector 196 may apply a load-balancing algorithm to determine which scanning element 112 should receive the event message and handle the scanning event. In the multi-cast implementation of FIG. 4B, however, the event detector may forego such a load-balancing algorithm and simply broadcast the detected event to each configured grid scanning element 112. In this case, grid scanning elements 112 may listen for event messages on a designated UDP port number over an Ethernet network. In some multi-cast embodiments, the event detector can simply broadcast a single message once and the message will be received by all of the grid scanning elements 112. In other multi-cast embodiments, it may be necessary for the event detector to send more than one event message to the several grid scanning elements to overcome restrictions of the local network environment, such as firewalls. In multi-cast embodiments of the invention, the grid scanning elements 112 themselves can be made responsible for performing the load-balancing algorithm in order to elect a single grid scanning element 112 to handle the scanning event.

As discussed, the load-balancing algorithm may be performed by an event detector 196 or by the grid scanning elements 112. The load-balancing algorithm can take many different forms. In one embodiment, the load-balancing algorithm may dictate that each grid scanning element 112 take its turn in a pre-determined order. For example, if the computing grid is configured with two scanning elements 112, then the first scanning element will handle the first event, the second scanning element will handle the second scanning event, the first scanning element will handle the third event, and so on.

In other embodiments, more sophisticated load-balancing algorithms can be used. For example, a mathematical hash function can be applied to the pathname, or some other unique attribute, of the file-to-be-scanned. After the hash function has been applied and a numeric result has been obtained, a modulo operation can be performed wherein the numeric hash function result is divided by the number of active grid scanning elements 112 with the remainder of the division specifying the scanning element which has been elected. One choice for a hash function is the well-known MD5 cryptographic hash function. In addition to the load-balancing algorithms for electing a grid scanning element 112 which have been disclosed, any other type of load-balancing algorithms can be implemented in accordance with various embodiments of the invention.

At blocks 406 and 408 of the multi-cast implementation of FIG. 4B, each grid scanning element 112 determines whether it has been elected to handle the detected scan event. (In the uni-cast implementation of FIG. 4A, the elected scanning element 112 is the only grid scanning element to receive the event message.) Any grid scanning elements 112 which are not elected may ignore the event message. Once a grid scanning element 112 has been elected, it will proceed to access the event-causing data from the appropriate storage device 115 (arrows 410 and 412 of FIGS. 4A and 4B). In some embodiments, the elected grid scanning element will access the file-to-be-scanned in a storage device over a SAN or a NAS network, or a combination of the two. Once the elected grid scanning element 112 has accessed the file, it may scan it for viruses, content, or any other characteristic of interest. This scanning operation can be performed by any method currently known in the art, or later developed. For example, many algorithms for scanning a file for viruses exist, and many more continue to be developed. Any of these methods may be suitable for implementation in the disclosed inventions. Finally, once the elected grid scanning element 112 has completed the scan of the event-causing data, it can notify a grid coordinator 140 of the results of the scan.

A dynamic method for handling file scan events as they arise has been disclosed. However, it may also be advantageous to perform file scanning on files within the data storage and backup system which are not new and have not been recently updated, such that they would trigger a file scan event in an event detector. These files may consist of data stored prior to the time when means were available to perform the type of scanning operations discussed in this specification. It may be advantageous in some cases to systematically access and scan these older files for the same reasons it is advantageous to scan newly created or updated files. Therefore, to the extent that a grid scanning element 112 is idle, it can be programmed to systematically traverse storage devices 115 for files that have never been scanned or perhaps have not been scanned by up-to-date algorithms. In some embodiments, older files in need of being scanned can be identified by creating a database listing each file in the file system along with a flag entry that stores whether or not the file has ever been scanned along with the date the last scan was performed. This information is then updated after the file scan is complete.

When a scanning element 112 encounters an old file that needs to be scanned, a scan event arises and a similar method can be used as was described in connection with the dynamic handling of file scan events as they arise. Namely, a load-balancing algorithm can be performed to determine which scanning element is to handle the scan event. In the case where the scanning element itself has traversed the file system and found the already existing file-to-be-scanned, it may be beneficial to automatically elect that very scanning element to perform the scan on that file. In some embodiments, however, a separate grid component (not shown) may be deployed to traverse the file system in search of existing files that need to be scanned. In these embodiments, the same sort of scanning element election algorithm discussed above could be employed.

As illustrated in FIGS. 4A and 4B, a grid scanning element 112 can be configured to notify a grid coordinator 140 of the results of a scan once it has been completed. Much like event detectors 196 and grid scanning elements 112, grid coordinators 140 can be implemented in a number of different ways, in hardware, software, or some combination of the two. In some embodiments, the grid coordinator 340 can be a network service implemented in software. In other embodiments, the grid coordinator 340 may be deployed on a cluster of computers with active-passive failover capabilities to increase its availability. In still other embodiments, the grid coordinator 340 can be deployed as software embedded in a dedicated "appliance" system, or a cluster of such appliances with failover capabilities. FIG. 1, in particular, illustrates an appliance-type grid coordinator 140, as well as a grid coordinator implemented as a software module running on a server computer coupled to the LAN 110.

The following are some exemplary functions which may be performed by the grid coordinator 140: monitoring the activity status of grid scanning elements 112 and event detectors 112 and notifying active grid components of any change to the configuration of the grid; receiving scan reports from the grid scanning elements 112 and processing them according to user preferences; and distributing configuration changes and software updates to components of the grid as needed. The grid coordinator 140 can also be programmed to perform other functions as needed. It should be appreciated that the term "grid coordinator" can also apply to a set of discrete components which implement some or all of these tasks.

The grid coordinator 140 may use any combination of multi-cast messages and individual transmissions to carry out its functions. The method of communication employed by the grid coordinator 140 will likely vary according to the configuration of the computing grid and the purpose for which it has been deployed. However, it is well within the ability of one of ordinary skill in the art to modify and adapt the concepts disclosed in this specification without departing from the scope of the described inventions.

One task that is performed by a grid coordinator 140 in certain embodiments of the invention is monitoring the activity status of each event detector 196 or grid computing element 112 to detect changes to the scanning grid architecture. For example, in some instances the computational load of scanning files may increase over time in conjunction with changes or growth in utilization of a host computing system. In these cases additional scanning elements 112 can be added as needed to keep up with increasing load demands of the host computing system. Whenever a grid scanning element 112 is added or removed from the grid, a grid coordinator 140 may notify the other grid components and make necessary adjustments for the successful continued operation of the grid. One instance of an adjustment that may be necessary when a new grid scanning element 112 is added to the grid is that the load-balancing algorithm may need to be adjusted to account for the presence of the new scanning element 112.

In one embodiment, each of the grid components, including event detectors 196 and grid scanning elements 112, can be configured to report their status to the grid coordinator. Operational status reports can be sent by grid components periodically at specified intervals. This may take the form of a simple "heartbeat" signal which a grid component sends periodically to make the grid coordinator aware that the component is still operational. In other embodiments a grid component may only send a status report when a change in operational status is anticipated.

In other embodiments, the grid coordinator 140 itself may poll grid components to determine their operational status. The grid coordinator 140 may transmit periodic requests for status reports from grid components, or it may request status reports according to some other schedule.

When the grid coordinator 140 detects a change in the operational status of any grid component, whether by that component failing to send a heartbeat signal or failing to respond to a status request, it may transmit a notification of the status change to the other grid components. This information can be used by the various grid components to update the scanning element 112 election procedure or for any other reason for which that information may be of use. In some embodiments, the grid coordinator may use a multi-cast protocol to transmit the notification of the status change, while in other embodiments individual transmissions to the remaining grid components may be preferable.

The grid coordinator 140 can also receive reports from the grid scanning elements 112 regarding the outcome of a scan that has been performed. In embodiments where scanning elements are deployed for computer virus scanning, a report can be sent to the grid coordinator detailing that the scan was completed, whether or not a virus was found, etc. In embodiments where scanning elements are deployed to search for file content violations of local administrative policy, a report can be sent detailing whether or not prohibited file content was found. In embodiments where the grid scanning elements are deployed to serve some other purpose, any other kind of appropriate report can be generated by the scanning elements 112 and sent to the grid coordinator 140.

The grid coordinator 140 may then take some course of action based on the scan report. In some cases the course of action may be pre-determined and user-defined. In this type of embodiment, the grid coordinator 140 may include a policy database. The policy database may be configurable by a user and may contain a list of report results, such as "virus detected" or "pornography detected," as well as corresponding actions to be performed when the associated scan report is received. In other embodiments, the grid coordinator 140 may be endowed with learning algorithms to independently determine what course of action to take based on its past experience or based on a set of training data that has been provided to guide its actions.

A non-comprehensive list of actions that could be taken by the grid coordinator 140 based on a scan report includes deleting a virus-contaminated file, quarantining the file, or notifying an administrator via email of a possible violation of administrative policy such as detected pornography, game, or music files.

On occasion, a user may wish to update the software associated with a grid component, e.g. change the algorithms used by event detectors 196 to detect scanning events or the algorithms used to elect grid scanning elements. A user may also wish to change the configuration of the grid. The grid coordinator 140 may serve as a software and configuration update service for the rest of the grid components in these situations. The user may submit these and other changes to the grid coordinator 140 via an included user interface. The user interface may consist of any type of interface known in the art. In one embodiment, the user interface is implemented by a web server packaged with the coordinating service. This type of interface can be useful because it allows a remote user to re-configure and update the grid.

The grid coordinator 140 can perform these updates periodically or according to any other schedule. It can transmit updates via multi-cast or individual transmissions as appropriate. The grid coordinator 140 may also monitor the progress and completion of installing the updates.

While embodiments of the invention have been discussed primarily in the context of the host computing system illustrated in FIG. 1, embodiments of the invention can be incorporated into many other types of host computing systems. For example, FIG. 2 illustrates a host computing system 200, incorporating a scanning grid, which includes data storage devices 215 coupled to the system via a Storage Area Network 211. FIG. 2 also includes event detectors 296, grid scanning elements 212, and grid coordinators 240. FIG. 3 illustrates a host computing system 300, incorporating a scanning grid, which includes data storage devices 315 coupled to the system via Network Attached Storage units 316. Similarly, FIG. 3 also includes event detectors 396, a grid scanning element 312, and grid coordinators 340.

Storage Area Networks (SAN) and Network Attached Storage (NAS) are known in the art and the components of the scanning grid operate similarly in the context of these systems to the ways in which they have been described above, primarily in the context of the host computing system of FIG. 1. The primary difference between the embodiments shown in FIGS. 2 and 3, as compared to the embodiment shown in FIG. 1, is the particular way in which storage devices are connected to and accessed by the host computing system as well as the scanning grid. Benefits of SAN and NAS systems are known in the art and can be further enhanced with the inclusion of scanning grids as described above.

Various embodiments of scanning grids incorporated into host computing systems have been disclosed. According to these embodiments, the computational load from file scanning can be shifted from the host computing system to the grid. There is a tradeoff, however, between client versus grid-based scanning. Using the host computing system to perform a portion of the file scanning may increase latency for other operations on the host computing system, whereas off-loading the virus scanning will result in the need for computing capital expenditures in the form of purchasing grid components. Therefore, some embodiments of the disclosed inventions may provide user-configurable options to balance this performance tradeoff by allocating file scanning tasks between the host computing system and the grid as desired.

Scanning grids, according to various embodiments of the invention, can also be included in several types of multi-purpose data storage systems that perform a suite of storage-related operations on electronic data for one or more client computers in a networked environment. In one embodiment, the storage system can be composed of modular storage cells which function in a coordinated manner. These cells can act as building blocks to create a data storage system that is scalable and adaptable in terms of the storage capacity and functionality that it provides for a host computing system. The storage-related operations performed by the data storage system may include data backup, migration, and recovery.

Figure 5:
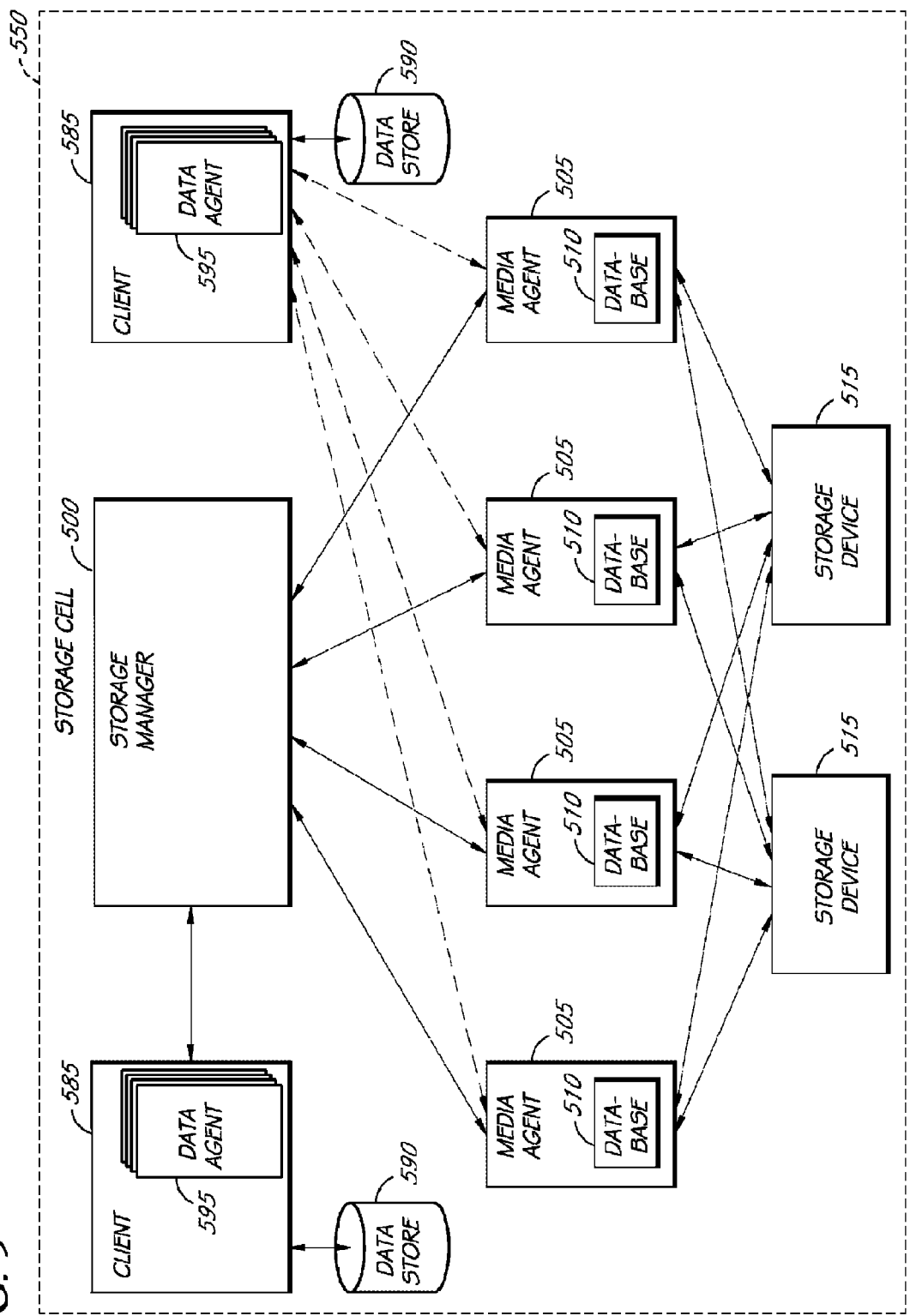
FIG. 5 is a schematic illustration of an embodiment of a data storage system for performing data storage operations for one or more client computers.

FIG. 5 illustrates a storage cell building block of a modular data storage and backup system. A storage cell 550 of a data storage system performs storage operations on electronic data for one or more client computers in a networked computing environment. The storage system may comprise a Storage Area Network, a Network Attached Storage system, a combination of the two, or any other storage system at least partially attached to a host computing system and/or storage device by a network. Besides operations that are directly related to storing electronic data, the phrase "storage operation" is intended to also convey any other ancillary operation which may be advantageously performed on data that is stored for later access.

Storage cells of this type can be combined and programmed to function together in many different configurations to suit the particular data storage needs of a given set of users. Each storage cell 550 may participate in various storage-related activities, such as backup, data migration, quick data recovery, etc. In this way storage cells can be used as modular building blocks to create scalable data storage and backup systems which can grow or shrink in storage-related functionality and capacity as needs dictate. This type of system is exemplary of the CommVault QiNetix system, and also the CommVault GALAXY backup system, available from CommVault Systems, Inc. of Oceanport, N.J. Similar systems are further described in U.S. patent applications Ser. Nos. 09/610,738 AND 11/120,619, which are hereby incorporated by reference in their entirety.

As shown, the storage cell 550 may generally comprise a storage manager 500 to direct various aspects of data storage operations and to coordinate such operations with other storage cells. The storage cell 550 may also comprise a data agent 595 to control storage and backup operations for a client computer 585 and a media agent 505 to interface with a physical storage device 515. Each of these components may be implemented solely as computer hardware or as software operating on computer hardware.

Generally speaking, the storage manager 500 may be a software module or other application that coordinates and controls storage operations performed by the storage operation cell 550. The storage manager 500 may communicate with some or all elements of the storage operation cell 550 including client computers 585, data agents 595, media agents 505, and storage devices 515, to initiate and manage system backups, migrations, and data recovery. If the storage cell 550 is simply one cell out of a number of storage cells which have been combined to create a larger data storage and backup system, then the storage manager 500 may also communicate with other storage cells to coordinate data storage and backup operations in the system as a whole.

In one embodiment, the data agent 595 is a software module or part of a software module that is generally responsible for archiving, migrating, and recovering data from a client computer 585 stored in an information store 590 or other memory location. Each client computer 585 may have at least one data agent 595 and the system can support multiple client computers 185. In some embodiments, data agents 595 may be distributed between a client 585 and the storage manager 500 (and any other intermediate components (not shown)) or may be deployed from a remote location or its functions approximated by a remote process that performs some or all of the functions of data agent 595.

Embodiments of the disclosed inventions may employ multiple data agents 595 each of which may backup, migrate, and recover data associated with a different application. For example, different individual data agents 595 may be designed to handle Microsoft Exchange data, Lotus Notes data, Microsoft Windows file system data, Microsoft Active Directory Objects data, and other types of data known in the art. Other embodiments may employ one or more generic data agents 595 that can handle and process multiple data types rather than using the specialized data agents described above.

Generally speaking, a media agent 505 may be implemented as software module that conveys data, as directed by a storage manager 500, between a client computer 585 and one or more storage devices 515 such as a tape library, a magnetic media storage device, an optical media storage device, or any other suitable storage device. The media agent 505 controls the actual physical level data storage or retrieval to and from a storage device 515. Media agents 505 may communicate with a storage device 515 via a suitable communications path such as a SCSI or fiber channel communications link. In some embodiments, the storage device 515 may be communicatively coupled to a data agent 505 via a SAN or a NAS system, or a combination of the two.

It should be appreciated that any given storage cell in a modular data storage and backup system, such as the one described, may comprise different combinations of hardware and software components besides the particular configuration illustrated in FIG. 5. Furthermore, in some embodiments, certain components may reside and execute on the same computer. A storage cell may also be adapted to include extra hardware and software for performing additional tasks in the context of a data storage and backup system. In particular, storage operation cells may include hardware and software for file scanning operations, as further described below.

Figure 6:
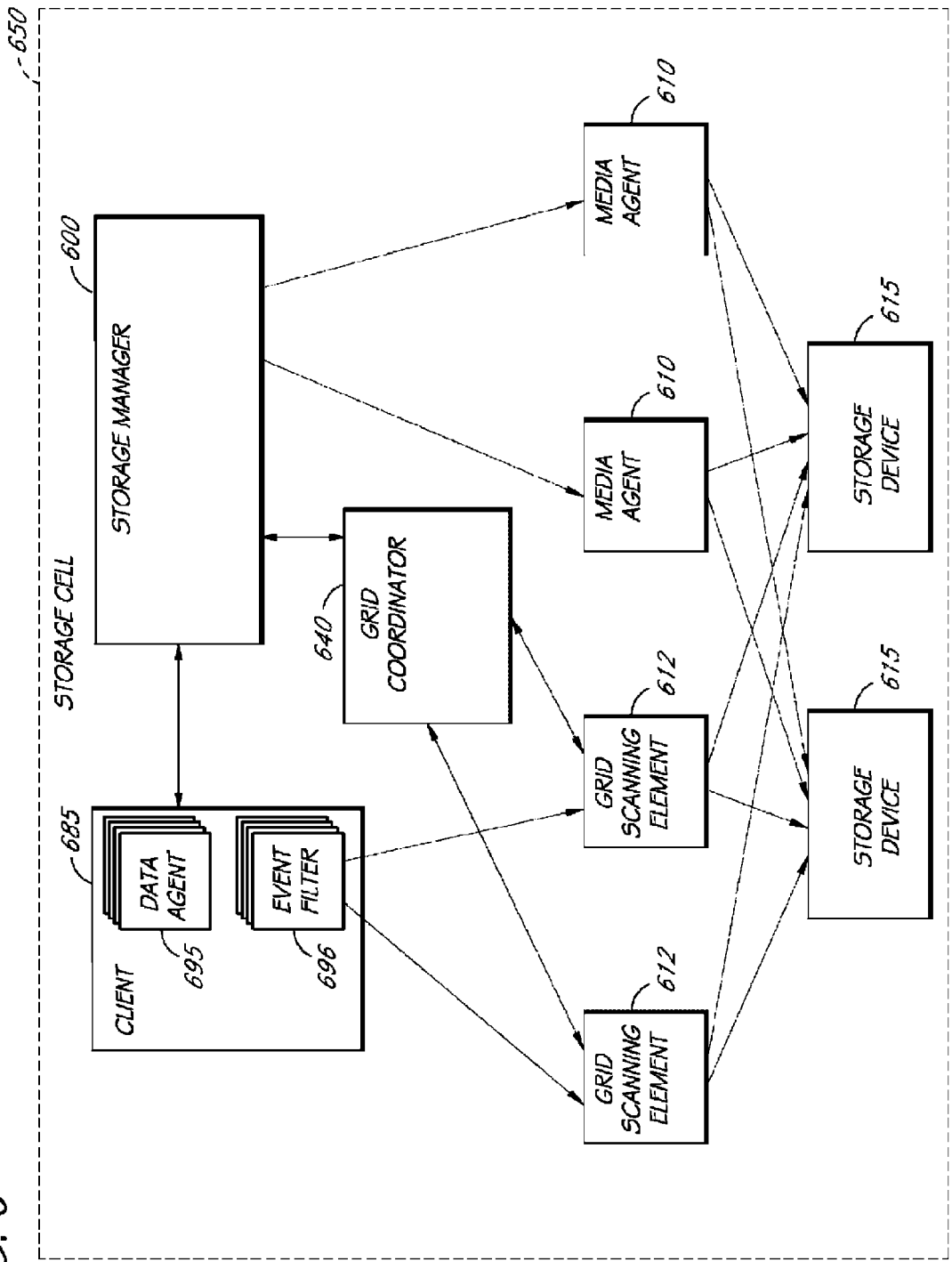
FIG. 6 is a schematic illustration of an embodiment of a scanning grid incorporated into a data storage system

FIG. 6 illustrates one embodiment of a scanning grid integrated with a storage cell of the type illustrated in FIG. 5. The modified storage cell 650 may include a client computer 685 with a data agent 695 and an event detector 696. The storage cell 650 may also include a storage manager 600, a grid coordinator 640, one or more grid scanning elements 612, one or more media agents 610, and one or more storage devices 615. Each of these components can function in a manner similar to the way in which each has been described above. The embodiment illustrated in FIG. 6 results in a data storage and backup system capable of performing file scanning in addition to the suite of other storage-related operations already mentioned.

Preferred embodiments of the claimed inventions have been described in connection with the accompanying drawings. While only a few preferred embodiments have been explicitly described, other embodiments will become apparent to those of ordinary skill in the art of the claimed inventions based on this disclosure. Therefore, the scope of the disclosed inventions is intended to be defined by reference to the appended claims and not simply with regard to the explicitly described embodiments of the inventions.

What is claimed is:

1. A computer system for scanning electronic data, the system comprising:

one or more event detectors to detect a data scanning event associated with a file in a file system and to generate a data scanning event message, wherein the one or more event detectors comprise at least one file system monitor that intercepts data storage transactions, wherein the one or more event detectors further determine whether to generate a scanning event message based on information about the data storage transaction, and wherein the event scanning message comprises pathname identification information that uniquely identifies and locates the file in the file system; and a computing grid of processors that are separate from the file system, wherein the computing grid of processors receive the event scanning message from the one or more detectors, the computing grid of processors comprising one or more scanning elements to receive the data scanning event message, wherein the one or more scanning elements determine based on the pathname, identification information which scanning element is to process the data scanning message to access event-causing data from one or more data storage devices accessible to a networked computing system, and to scan the event-causing data.

2. The system of claim 1, wherein the one or more data storage devices are accessible to the networked computing system via a Storage Area Network, a Network Attached Storage unit, or a combination of the two.

3. The system of claim 1, wherein the data scanning event message comprises a multi-cast message from an event detector to the one or more scanning elements.

4. The system of claim 1, wherein a data scanning event comprises the creation of new data.

5. The system of claim 1, wherein a data scanning event comprises an attempted modification to existing data.

6. The system of claim 1, wherein the one or more scanning elements are configured to generate a scan report after having completed a data scan and further comprising a grid coordinator to receive the scan report and to take a user-defined action based on the report.

7. The system of claim 6, wherein the user-defined action comprises deleting the data, quarantining the data, or notifying an administrator of the scan results.

8. The system of claim 1, wherein the one or more event detectors and the computing grid of processors are configured for integration with a data storage system, the data storage system configured to perform storage-related operations for one or more networked client computers.

9. The system of claim 8, wherein the storage-related operations comprise data backup, migration, or recovery.

10. The system of claim 8, wherein the storage system comprises modular storage cells which can be added to or subtracted to provide more or less storage capacity and storage operation functionality.

11. The system of claim 1, wherein each of the one or more scanning elements receives the data scanning event message and independently performs an operation to determine whether to handle the detected scanning event.

12. The system of claim 1, wherein the one or more scanning elements scan event-causing data for viruses or other malicious software code.

13. The system of claim 1, wherein the one or more scanning elements scan event-causing data for content violations of a local administrator policy.

14. The system of claim 1, wherein the one or more event detectors comprise a local area network (LAN) sniffer or a Storage Area Network (SAN) sniffer.

15. A method comprising:

detecting a data scanning event associated with a file in a file system with one or more event detectors, wherein the one or more event detectors comprise at least one file system monitor that intercepts data storage transactions, wherein the one or more event detectors further determine whether to generate a scanning event message based on information about the data storage transaction, and wherein the event scanning message comprises pathname identification information that uniquely identifies and locates the file in the file system;

accessing data associated with the scanning event from one or more data storage devices accessible to a networked computing system;

and scanning the event-causing data with a computing grid of processors, wherein the computing grid of processors are separate from the file system, wherein the computing grid of processors receive the event scanning message from the one or more detectors, the computing grid of processors comprising one or more scanning elements to receive the data scanning event message, and wherein the one or more scanning elements determine based on the pathname identification information, which scanning element is to scan the data associated with the scanning event.

16. The method of claim 15 wherein the data scanning event message comprises a multi-cast message to one or more scanning elements in the computing grid of processors.

17. The method of claim 15, wherein accessing and scanning the data associated with the data scanning event comprises generating a scan report after having completed a data scan and further comprising taking a user-defined action based on the report.

18. The method of claim 17, wherein the user-defined action comprises deleting the data, quarantining the data, or notifying an administrator of the scan results.

19. The method of claim 15, wherein scanning the data associated with the data scanning event comprises scanning for viruses or other malicious software code.

20. The method of claim 15, wherein scanning the data associated with the data scanning event comprises scanning for content violations of a local administrator policy.

21. A computer system comprising:

means for detecting a data scanning event associated with a file in a file system with one or more event detectors, wherein the one or more event detectors comprise at least one file system monitor that intercepts data storage transactions, wherein the one or more event detectors further determine whether to generate a scanning event message based on information about the data storage transaction, and wherein the event scanning message comprises pathname identification information that uniquely identifies and locates the file in the file system;

means for accessing data associated with the scanning event from one or more data storage devices accessible to a networked computing system;

a plurality of means for scanning the event-causing data, wherein the means for scanning is separate from the file system; and means for selecting one of the plurality of means for scanning the event-causing data to scan the event-causing data wherein the means for selecting uses the pathname identification information to determine which of the plurality of means for scanning is to scan the data associated with the scanning event.

22. The system of claim 21, wherein the means for detecting comprises a file system filter driver, a local area network (LAN) sniffer, or a Storage Area Network (SAN) sniffer.

23. The system of claim 21, wherein the means for accessing data comprises a file server computer, a Storage Area Network (SAN), a Network Attached Storage (NAS) unit, or a combination of the two.

24. The system of claim 21, wherein the plurality of means for scanning comprises a computing grid of processors.

25. The system of claim 21, wherein the means for selecting one of the plurality of means for scanning comprises a computer configured to perform a load-balancing algorithm.

* * * * *